May 29, 1956 — A. M. GEORGIEV — 2,747,827
MOUNTING STRUCTURE FOR CAPACITOR
Filed April 30, 1953

INVENTOR.
Alexander M. Georgiev
His Attorney

United States Patent Office 2,747,827
Patented May 29, 1956

2,747,827

MOUNTING STRUCTURE FOR CAPACITOR

Alexander M. Georgiev, Dayton, Ohio, assignor to General Motors Corporation, Detroit, Mich., a corporation of Delaware Application April 30, 1953, Serial No. 352,234

1 Claim. (Cl. 248—316)

This invention relates to a mounting structure for supporting a capacitor or a condenser upon another device, such as a dynamo-electric machine, or other structure.

An object of this invention is to provide an inexpensive mounting structure for a capacitor or condenser which can be used for mounting a relatively large number of capacitors of different size.

Another object of the invention is to provide a simplified and inexpensive mounting structure for a capacitor or condenser that rigidly supports the same upon another unit.

Further objects and advantages of the present invention will be apparent from the following description, reference being had to the accompanying drawings wherein a preferred form of the invention is clearly shown.

Capacitor type electric motors constitute a large percentage of electric motors in commercial use, particularly in sizes of less than 1 H. P. In fact, many of the electric motors used on household domestic appliances are of the capacitor type.

It will be understood of course that the capacitors used on electric motors vary in capacitance, as well as in physical size. The difference in physical size of the capacitors required for use on fractional horsepower motors of different horsepower size requires a mounting structure adapted to be utilized with a number of capacitors of different physical size to eliminate a large volume of different mounting pieces for the numerous capacitors.

Also, it is essential that a capacitor be mounted rigidly on the structure that supports the same to avoid undue relative movement between the capacitor and the structure that supports it. This is to avoid internal damage to the capacitor, particularly concerning breakage of terminal connections with the foils of the capacitors.

In this invention a mounting structure is arranged to provide for a rigid mounting of a capacitor casing upon an electric motor, and to provide for acceptance of capacitor casings of different physical size with a minimum change of the elements required for mounting of the capacitor.

Figure 1:
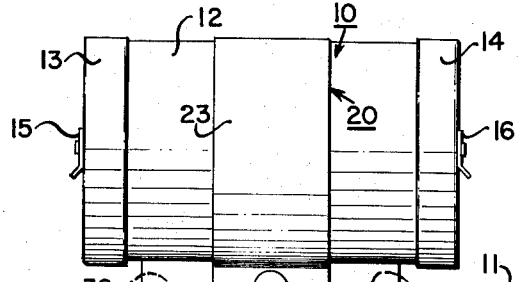
Figure 1 is a side elevational view illustrating the capacitor or condenser mounting of this invention.
Figure 2:
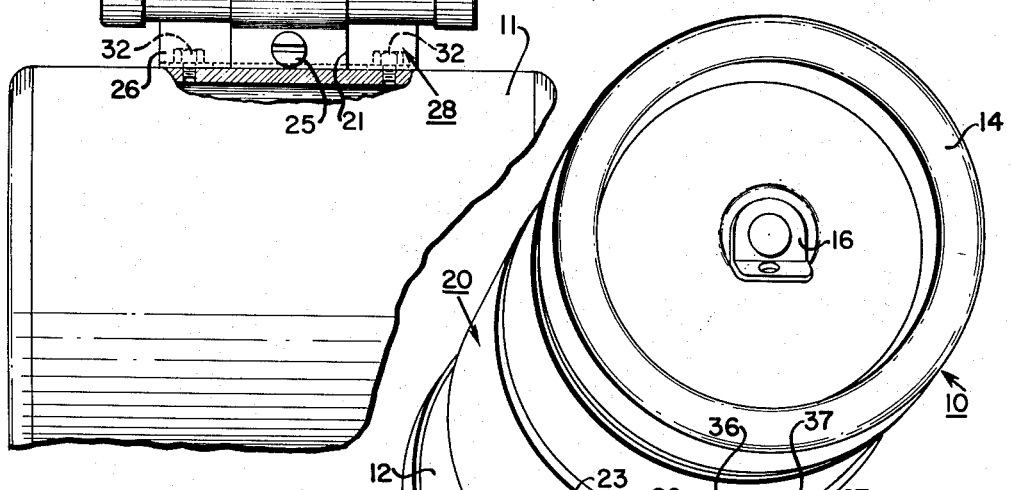
Figure 2 is a perspective elevational view of a capacitor and electric motor wherein the capacitor is being placed upon the electric motor.
Figure 3:
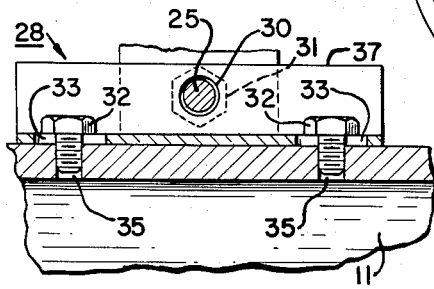
Figure 3 is a longitudinal cross sectional view of the mounting structure taken along line 3—3 of Figure 4.

In Figure 1 there is illustrated a capacitor or condenser 10 mounted upon a dynamo-electric machine 11, such as an electric motor. The capacitor 10 comprises a cylinder casing 12 having end caps 13 and 14 that close the end of the casing 12. Terminal connections 15 and 16 are provided on the capacitor casing 12 and provide the means for connecting the capacitor foils with the suitable winding of the electric motor 11.

It will be understood of course that the capacitor 10 illustrated in Figure 1 is merely representative of any capacitor that can be used with a dynamo-electric machine, 11.

The physical dimensions of the capacitor 10 differ somewhat depending upon the horsepower size of the electric motor 11, generally speaking a larger capacitor being required as the horsepower size of the motor increases. Thus, the physical size of the capacitor 10 may vary both in peripheral size and in length, depending upon various factors in the manufacture of the capacitor.

In this invention, the mounting structure for the capacitor 10 comprises a longitudinally inextensible strap 20. This strap 20 while being inextensible longitudinally is transversely flexible to permit it to be placed upon the capacitor casing 12. As illustrated, the capacitor casing 12 is cylindrical so that the strap 20 conforms to the outer periphery of the cylinder casing 12. However, it will be understood that the casing 12 can be of other configurations and that the strap 20 will conform to the configuration of the outer periphery of the casing 12.

Figure 4:
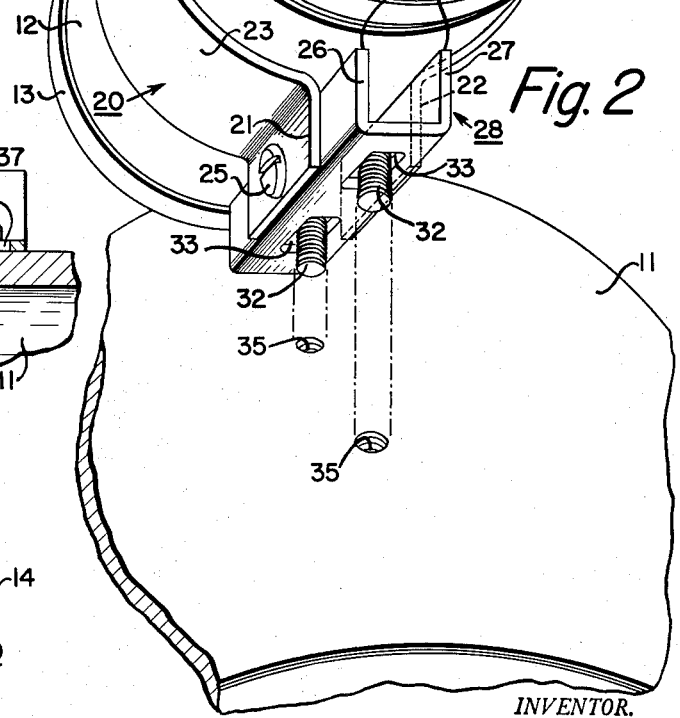
Figure 4 is an end elevational view of the mounting structure of this invention.

The strap 20 has its opposite free ends 21 and 22 bent substantially normal to the outer face 23 of the strap 20. Thus when the strap 20 is placed around the body of the casing 12 as illustrated in the drawings, the bent free end portions 21 and 22 of the strap 20 will be in substantial parallelism as illustrated in Figure 4.

Each of the free ends 21 and 22 of the strap 20 has a hole therein. These holes in the free ends 21 and 22 are in substantial axial alignment when the strap 20 is in position around the casing 12. Thus, a bolt 25 can extend through the holes in the free ends 21 and 22 of the strap 20.

The free ends of the straps 21 and 22 are positioned in engagement with the outer faces of the walls 26 and 27 of the relatively U-shaped bracket 28. The walls 26 and 27, the bracket 28 are in substantial parallelism and are connected together by a relative flat bottom wall 29.

The walls 26 and 27 each have a hole 30 through which the bolt 25 extends. A nut 31 is placed upon the threaded end of the bolt 25 and secures the strap to the support bracket 28.

The support bracket 28 is secured to the casing of the electric motor 11 by means of bolts 32 that pass through longitudinally elongated slots 33 placed in the bottom wall 29 of the bracket 28. The bolts 32 are received in threaded holes 35 provided in the casing of the motor 11.

From the foregoing description it will be apparent that the bracket 28 is first placed upon the casing of the motor 11 and secured thereto by the bolts 32. Thereafter, the capacitor 10 with the strap 20 around the same is placed upon the bracket 28 and secured thereto by the bolt 25 and nut 31.

The bracket 28 has a substantial length relative to the capacitor casing 12, but is shorter than the same, so that substantial longitudinal support is given to the capacitor to prevent it from pivoting longitudinally about the bolt 25. Also, the upper edges 36 and 37 of the bracket walls 26 and 27 are adapted to engage the body of the casing 12 of the capacitor 10 to provide both longitudinal and transverse support for the capacitor.

It will be readily appreciated that capacitors having different length can be supported by the strap 20 and the bracket 28 without any change whatsoever in the size or shape of these elements. It will also be appreciated that capacitors of different diameter, or of different peripheral size or configuration can be supported upon the bracket 28 with the strap 20 being the only element requiring any change to accomplish the different peripheral size or configuration of the capacitor casing 12.

The edges 36 and 37 provide means to rigidly support capacitors of different diameter, it being readily appreciated that any arcuate surface of any diameter will be readily supported by the edges 36 and 37 to prevent rolling of the capacitor relative to the bracket 28.

While the form of embodiment of the invention as herein disclosed constitutes a preferred form, it is to be understood that other forms might be adopted as may come within the scope of the claim which follows.

What is claimed is as follows:

In a mounting structure for a capacitor, the combination of, a longitudinally extending generally U shaped channel member having relatively parallel edges on the free ends of the walls forming the side walls of the U shaped channel member, an opening in each of the side walls of the channel member intermediate opposite ends thereof, said openings being coaxially aligned, other openings in the bottom wall of the channel member, one of said other openings being disposed between each of opposite ends of said channel member and the openings in the side walls thereof, a cylindrical casing member positioned on said channel member with the axis of the casing member parallel with the longitudinal length of the channel member and the periphery of the casing member being supported by the longitudinal edges of the side walls of the channel member, a longitudinally inextensible but transversely flexible ribbon strap encircling the periphery of said casing and having opposite ends of the strap bent substantially normal in the same direction from one face of the strap, said bent ends respectively engaging opposite side walls of said channel member and having openings therein coaxially aligned with the openings in the side walls of said channel member, said channel member being of a length substantially greater than the width of said strap for extension of the channel member beyond each of opposite side edges of the strap for longitudinal support of the casing thereby to prevent rotation of the casing about the axis of the holes in the side walls of the channel member, and fastening means extending through said holes in said ends of said strap and in the side walls of said channel member securing thereby said casing onto said channel member.

References Cited in the file of this patent

UNITED STATES PATENTS

| | | |
|---|---|---|
| 624,484 | Haskell | May 9, 1899 |
| 1,919,767 | Bohlman | July 25, 1933 |
| 2,113,180 | Klein | Apr. 5, 1938 |
| 2,469,451 | Burrus | May 10, 1949 |
| 2,494,881 | Kost | Jan. 17, 1950 |
| 2,592,895 | Harris | Apr. 15, 1952 |